US012593363B2

(12) United States Patent
Viger et al.

(10) Patent No.: US 12,593,363 B2
(45) Date of Patent: Mar. 31, 2026

(54) METHOD AND APPARATUS FOR MULTI-LINK SETUP BETWEEN MULTI-LINK NON-AP LOGICAL ENTITIES

(71) Applicant: CANON KABUSHIKI KAISHA, Tokyo (JP)

(72) Inventors: Pascal Viger, Janze (FR); Stéphane Baron, Le Rheu (FR); Patrice Nezou, Liffre (FR)

(73) Assignee: Canon Kabushiki Kaisha, Tokyo (JP)

( * ) Notice: Subject to any disclaimer, the term of this patent is extended or adjusted under 35 U.S.C. 154(b) by 602 days.

(21) Appl. No.: 17/910,319

(22) PCT Filed: Mar. 3, 2021

(86) PCT No.: PCT/EP2021/055323
§ 371 (c)(1),
(2) Date: Sep. 8, 2022

(87) PCT Pub. No.: WO2021/180541
PCT Pub. Date: Sep. 16, 2021

(65) Prior Publication Data
US 2023/0119901 A1      Apr. 20, 2023

(30) Foreign Application Priority Data
Mar. 10, 2020    (GB) ...................................... 2003452

(51) Int. Cl.
*H04W 76/15* (2018.01)
*H04W 28/02* (2009.01)

(52) U.S. Cl.
CPC ....... *H04W 76/15* (2018.02); *H04W 28/0263* (2013.01)

(58) Field of Classification Search
CPC .......................... H04W 76/15; H04W 28/0263
See application file for complete search history.

(56) References Cited

U.S. PATENT DOCUMENTS 8,995,257 B2 *   3/2015   Chu .................... H04W 40/246
                                                          370/230.1
2019/0150214 A1 *   5/2019   Zhou ..................... H04W 76/15
                                                          370/329
(Continued)

FOREIGN PATENT DOCUMENTS

KR        20180054553  A   *  5/2018

OTHER PUBLICATIONS

Dibakar Das, EHT Direct Link Transmission, IEEE Draft, IEEE-SA Mentor, vol. 802.11 EHT, 802.11be, No. 1, CP068165219, Jan. 14, 2020, pp. 1-14.

(Continued)

*Primary Examiner* — Saad A. Waqas
(74) *Attorney, Agent, or Firm* — Canon U.S.A., Inc. IP Division

(57) ABSTRACT
The invention relates in one of its aspects to a method of communication in a wireless network comprising an access point multi-link device, AP MLD, and the wireless network further comprising a first and a second station multi-link devices, STA MLDs. The method comprising:
establishing a first link between a station of the first STA MLD and an Access Point of the AP MLD;
establishing a second link between a station of the second STA MLD and an Access Point of the AP MLD;
establishing a third direct link between station of the first STA MLD and a station of the second STA MLD; and
transferring data between the first and the second STA MLDs through the third link.

20 Claims, 12 Drawing Sheets

(56)        References Cited

U.S. PATENT DOCUMENTS

| | | | | |
|---|---|---|---|---|
| 2019/0261402 A1* | 8/2019 | Asterjadhi | ............ | H04W 72/21 |
| 2020/0045656 A1* | 2/2020 | Verma | ................. | H04W 56/001 |
| 2020/0359259 A1* | 11/2020 | Patil | ..................... | H04W 88/08 |
| 2021/0400662 A1* | 12/2021 | Huang | ................. | H04W 72/51 |

OTHER PUBLICATIONS

Edward Au, Specification Framework for TGbe, IEEE Draft, IEEE-SA Mentor, vol. 802.11 EHT, 802.11be, No. 5, CP068164892, Nov. 11, 2019, pp. 1-12.

Edward Au, Specification Framework for TGbe, IEEE Draft, IEEE-SA Mentor, vol. 802.11 EHT, 802.11be, No. 8, CP068165651, Feb. 12, 2020, pp. 1-20.

* cited by examiner

510   Establishing a first link

520   Establishing a second link

530   Establishing a third link

540   Transferring data through the third link

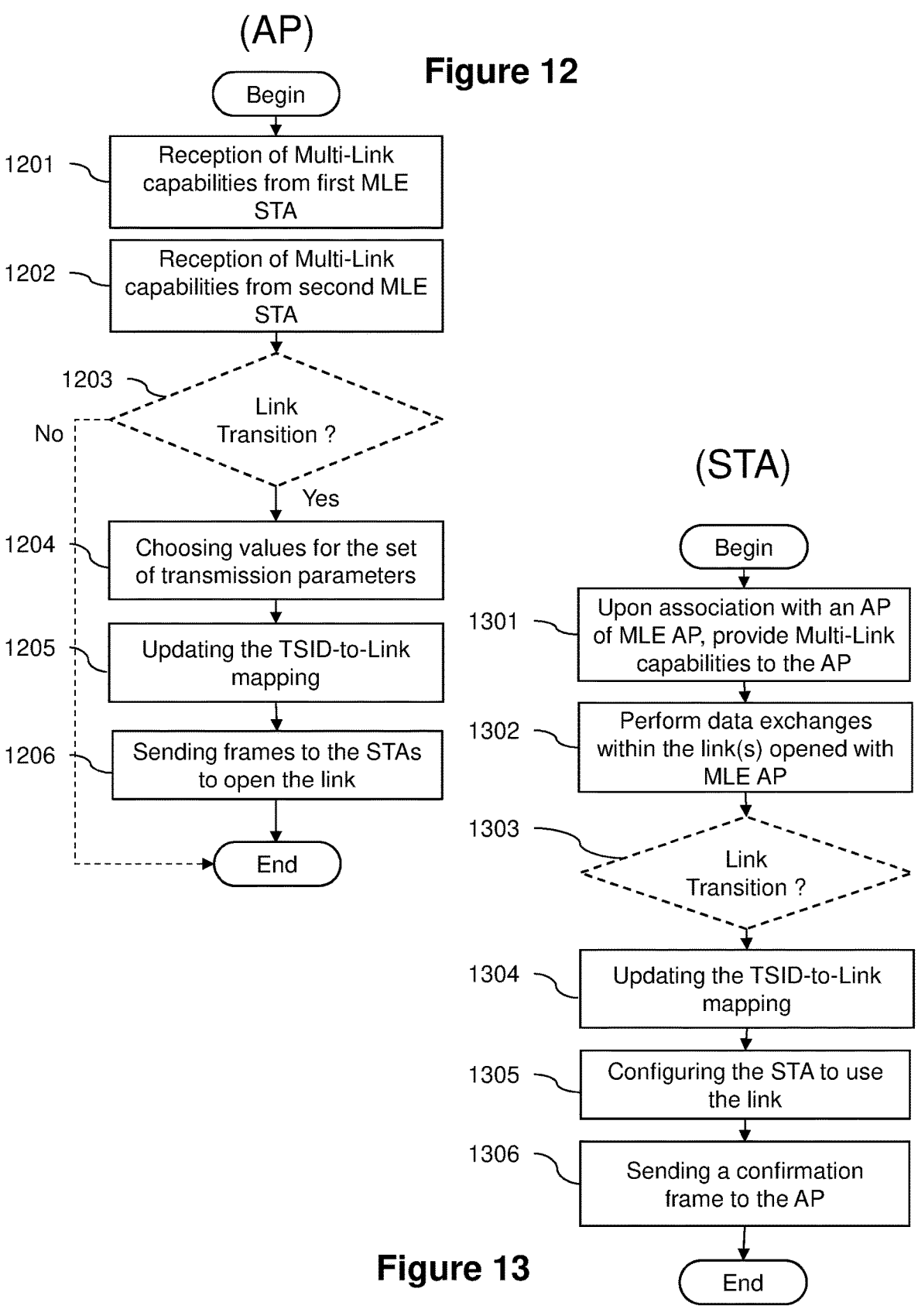

Begin

1201 — Reception of Multi-Link capabilities from first MLE STA

1202 — Reception of Multi-Link capabilities from second MLE STA

1203 — Link Transition ?

No

Yes

1204 — Choosing values for the set of transmission parameters

1205 — Updating the TSID-to-Link mapping

1206 — Sending frames to the STAs to open the link

End (STA)

Begin

1301 — Upon association with an AP of MLE AP, provide Multi-Link capabilities to the AP 1302 — Perform data exchanges within the link(s) opened with MLE AP 1303 — Link Transition ?

1304 — Updating the TSID-to-Link mapping

1305 — Configuring the STA to use the link

1306 — Sending a confirmation frame to the AP

End

Figure 13

METHOD AND APPARATUS FOR MULTI-LINK SETUP BETWEEN MULTI-LINK NON-AP LOGICAL ENTITIES

CROSS REFERENCE TO RELATED APPLICATIONS

This is a National Stage Application filed under 35 U.S.C. 371 of International Application No. PCT/EP2021/055323, filed on Mar. 3, 2021, which claims the benefit under 35 U.S.C. § 119(a)-(d) of United Kingdom Patent Application No. 2003452.6, filed on Mar. 10, 2020 and entitled "Method and Apparatus for Multi-Link Setup between Multi-Link Non-AP Logical Entities". The above cited patent applications are incorporated herein by reference in their entireties.

FIELD OF THE INVENTION

The present invention relates generally to communication networks and more specifically to wireless communication methods in wireless network comprising a plurality of stations clustered into a plurality of multi-link entities, one of these multi-link entities playing the role of an access point, the other multi-link entities being connected to the access point, and corresponding devices.

The invention finds application in particular to the access of an 802.11be standard network.

BACKGROUND OF THE INVENTION

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth and decreasing latency requirements that are demanded for wireless communications systems in high-density environments, multi-user (MU) schemes are being developed to allow a single access point (AP) to schedule MU transmissions, i.e. multiple simultaneous transmissions to or from non-AP stations, in the wireless network. For example, one of such MU schemes has been adopted by the Institute of Electrical and Electronics Engineers (IEEE) in the 802.11ax standard, draft version 3.0 (D3.0) of June 2018.

Thanks to the MU feature, a station has the opportunity to gain access to the wireless medium via two access schemes: the MU scheme and the conventional Enhanced Distributed Channel Access—EDCA (Single User, SU) scheme.

However, SU and MU schemes directly compete one against the other to gain access to the wireless medium (by the AP for MU schemes, by a non-AP station for the SU scheme). In high density environment, this competition generates a large amount of undesirable collisions, thereby degrading latency and overall useful data throughput. Therefore, some mechanisms were introduced to favor MU scheme compared to SU scheme.

As a successor of 802.11ax, the 802.11be standard, namely EHT standing for "Extremely High Throughput", is being considering a feature called multi-link operation (MLO), wherein a single device can support multiple links and the data of the device can be delivered to another device through the multiple links. Multi-link feature can increase the peak/average throughput of the device. The Multi-link capability is negotiated during the initial association between a non-AP station and the intended AP.

A "multi-link AP logical entity" (MLE AP) is a multi-link logical entity, wherein each station (STA) within the multi-link logical entity is an AP. A multi-link non-AP logical entity (non-AP MLE or MLE STA) is a multi-link logical entity, wherein each station within the multi-link logical entity is a non-AP STA.

The multi-link operation is not adapted to bandwidth-demanding communication services between two (non-AP) stations, e.g. video-based services such as gaming, virtual reality, streaming applications. This is because all the communications (besides any used link(s)) go through the AP, thereby doubling the air-time for transmission but also the number of medium accesses (and thus of medium access time).

Indeed, efficient use of the resources of a wireless local-area network (WLAN) is important to provide bandwidth and acceptable response times to the users of the WLAN.

SUMMARY OF INVENTION

The present invention has been devised to address one or more of the foregoing concerns.

According to a first aspect of the invention, there is provided a method of communication in a wireless network comprising an access point multi-link device, AP MLD, and the wireless network further comprising a first and a second station multi-link devices, STA MLDs. The method comprises:

establishing a first link between a station of the first STA MLD and an Access Point of the AP MLD;

establishing a second link between a station of the second STA MLD and an Access Point of the AP MLD;

establishing a third direct link between a station of the first STA MLD and a station of the second STA MLD; and transferring data between the first and the second STA MLDs through the third link.

The advantage of the method is to propose a solution to create a peer to peer link between two STA MLDs and saving thus resources of the wireless network, such as bandwidth and response time.

The method may comprise other features, alone or in combination, such as the establishing a third direct link comprises sending, by the AP MLD, parameters of the third direct link to the first and second STA MLDs through the first and second links;

the AP MLD comprises at least a first and a second Access Points and each of the first and second STA MLDs comprises at least a first station and a second station, the AP MLD has a single medium access control, MAC, service access point to an upper layer and each of the STA MLDs has a single MAC service access point to an upper layer;

the establishing a first link comprises establishing a link between the first station of the first STA MLD and the first Access Point of the AP MLD; and the establishing a second link comprises establishing a link between the first station of the second STA MLD and the second Access Point of the AP MLD.

the establishing a first link comprises establishing a link between the first station of the first STA MLD and the first Access Point of the AP MLD;

and the establishing a second link comprises establishing a link between the first station of the second STA MLD and the first Access Point of the AP MLD;

the establishing a third direct link comprises establishing a link between the second station of the first STA MLD and the second station of the second STA MLD;

a traffic stream is mapped onto the third direct link;

the traffic stream mapping is associated with the traffic stream being unmapped from the first or the second link;

the wireless network is 802.11e compliant, and the traffic stream is identified by a Traffic Stream Identifier, TSID, the TSID being independent of any traffic priority; and/or the traffic stream contains frames of at least two traffic priorities stored in at least two Access Category queues.

According to a second aspect of the invention, there is provided a method of communication in a wireless network comprising an access point multi-link device, AP MLD, and the wireless network further comprising a first and a second station multi-link devices, STA MLDs. The method comprises, for the AP MLD:

establishing a first link between a station of the first STA MLD and an Access Point of the AP MLD;

establishing a second link between a station of the second STA MLD and an Access Point of the AP MLD; and sending parameters to the first STA MLD and the second STA MLD for allowing them to establish a third direct link between a station of the first STA MLD and a station of the second STA MLD.

According to a third aspect of the invention, there is provided a method of communication in a wireless network comprising an access point multi-link device, AP MLD, and the wireless network further comprising a first and a second station multi-link devices, STA MLDs. The method comprises, for each STA MLD:

establishing a first link between a station of the STA MLD and an Access Point of the AP MLD;

establishing a third direct link between a station of the first STA MLD and a station of the second STA MLD;

transferring data between the first and the second STA MLDs through the third link.

According to a fourth aspect of the invention, there is provided a communication device in a wireless network comprising an access point multi-link device, AP MLD, and the wireless network further comprising a first and a second station multi-link devices, STA MLDs, the communication device, acting as the AP MLD, comprising at least one microprocessor configured for carrying out the steps of the method according to the second or third aspect.

At least parts of the methods according to the invention may be computer implemented. Accordingly, the present invention may take the form of an entire hardware embodiment, an entire software embodiment (including firmware, resident software, microcode, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer-readable code for provision to a programmable apparatus on any suitable carrier medium. A tangible carrier medium may comprise a storage medium such as a floppy disk, a CD-ROM, a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g., a microwave or RF signal.

BRIEF DESCRIPTION OF THE DRAWINGS

Embodiments of the invention will now be described, by way of example only, and with reference to the following drawings in which:

FIG. 12 is a flowchart illustrating a method for transitioning a traffic stream from one link to a P2P link; and FIG. 13 is a flowchart illustrating another method for transitioning a traffic stream from one link to a P2P link.

DETAILED DESCRIPTION

Figure 1:
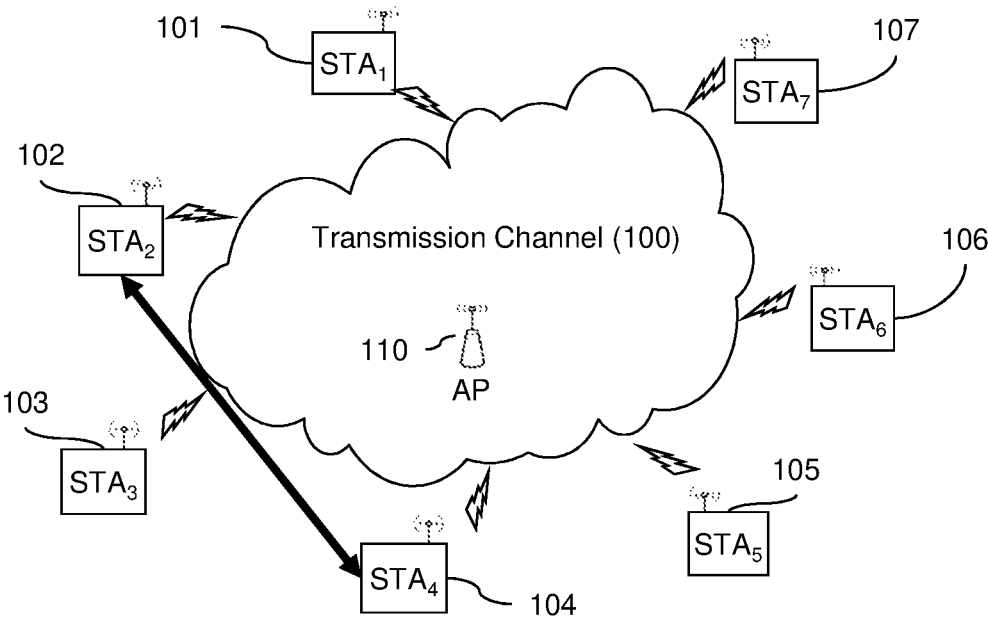
FIG. 1 illustrates a typical wireless communication system in which embodiments of the invention may be implemented.

The invention will now be described by means of specific non-limiting exemplary embodiments and by reference to the figures.

The techniques described herein may be used for various broadband wireless communication systems, including communication systems that are based on an orthogonal multiplexing scheme. Examples of such communication systems include Spatial Division Multiple Access (SDMA) system, Time Division Multiple Access (TDMA) system, Orthogonal Frequency Division Multiple Access (OFDMA) system, and Single-Carrier Frequency Division Multiple Access (SC-FDMA) system. An SDMA system may utilise different directions to simultaneously transmit data belonging to multiple user terminals. A TDMA system may allow multiple user terminals to share the same frequency channel by dividing the transmission signal into different time slots or resource units, each time slot being assigned to different user terminal. An OFDMA system utilises orthogonal frequency division multiplexing (OFDM), which is a modulation technique that partitions the overall system bandwidth into multiple orthogonal sub-carriers or resource units. These sub-carriers may also be called tones, bins, etc. With OFDM, each sub-carrier may be independently modulated with data. An SC-FDMA system may utilise interleaved FDMA (IFDMA) to transmit on sub-carriers that are distributed across the system bandwidth, localised FDMA (LFDMA) to transmit on a block of adjacent sub-carriers, or enhanced FDMA (EFDMA) to transmit on multiple blocks of adjacent sub-carriers.

The teachings herein may be incorporated into (e.g., implemented within or performed by) a variety of apparatuses (e.g., stations). In some aspects, a wireless station implemented in accordance with the teachings herein may comprise an access point (so-called AP) or not (so-called non-AP station).

An AP may comprise, be implemented as, or known as a Node B, Radio Network Controller ("RNC"), evolved Node B (eNB), Base Station Controller ("BSC"), Base Transceiver Station ("BTS"), Base Station ("BS"), Transceiver Function ("TF"), Radio Router, Radio Transceiver, Basic Service Set ("BSS"), Extended Service Set ("ESS"), Radio Base Station ("RBS"), or some other terminology.

A non-AP station may comprise, be implemented as, or known as a subscriber station, a subscriber unit, a mobile station (MS), a remote station, a remote terminal, a user terminal (UT), a user agent, a user device, user equipment (UE), a user station, or some other terminology. In some implementations, a non-AP station may comprise a cellular telephone, a cordless telephone, a Session Initiation Protocol ("SIP") phone, a wireless local loop ("WLL") station, a personal digital assistant ("PDA"), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music or video device, or a satellite radio), a global positioning system (GPS) device, or any other suitable device that is configured to communicate via a wireless medium. In some aspects, the non-AP station may be a wireless node. Such wireless node may provide, for example, connectivity for or to a network (e.g., a wide area network such as the Internet or a cellular network) via a wired or wireless communication link.

FIG. 1 illustrates a communication system in which several communication stations (or "nodes") 101-107 exchange data frames over a radio transmission channel 100 of a wireless local area network (WLAN), under the management of a central station, or access point (AP) 110, also seen as a station of the network. The radio transmission channel 100 is defined by an operating frequency band constituted by a single channel or a plurality of channels forming a composite channel. In a variant, direct communications between STAs can be implemented without the use of an access point (known as an Ad-hoc mode).

Exemplary situation of direct communications, corresponding to an increasing trend nowadays, is the presence of peer-to-peer (P2P) traffic transmissions in between non-AP stations, e.g. STA 102 and STA 104 illustrated in the FIG. 1. Technologies that support P2P transmissions are formerly performed in Single-User scheme, for example WiFi-Miracast (RTM) or Wireless Display scenario, or Tunneled Direct Link Setup (TDLS). Note that even if P2P flows are usually not numerous, the amount of data per flow may be huge as, for instance, low-compressed video, from 1080p60 up to 8K UHD resolutions.

The term Wi-Fi may refer to one or more of the IEEE 802.11 communication standards.

The terms "traffic" and/or "traffic stream(s)" as used herein, are defined as a data flow and/or stream between wireless devices such as STAs.

Each STA 101-107 registers to the AP 110 during an association procedure. During the association procedure, the AP 110 assigns a specific Association IDentifier (AID) to the requesting STA. For example, the AID is a 16-bit value uniquely identifying the STA.

The stations 101-107, 110 may compete one against another using EDCA (Enhanced Distributed Channel Access) contention, to access the wireless medium in order to be granted a transmission opportunity (TXOP) and then transmit (single-user, SU) data frames. The stations may also use a multi-user (MU) scheme in which a single station, usually the AP 110, is allowed to schedule a MU transmission, i.e. multiple simultaneous transmissions to or from other stations, in the wireless network. One implementation of such a MU scheme has been for example adopted in IEEE 802.11ax amendment standard, as the Multi-User Uplink and Downlink OFDMA (MU UL and DL OFDMA) procedures.

As already discussed, various short-range wireless technologies like Bluetooth, WiFi Direct and LTE Direct (defined by the Third Generation Partnership Project (3GPP)) can be used to enable Peer-to-Peer (P2P), also known as Device-to-Device (D2D), communication. They differ mostly in the data rates, distance between 1-hop devices, device discovery mechanisms and typical applications.

In terms of spectrum usage, D2D communication is primarily classified into two types: inband and outband.

As example, for LTE, there is no coexistence for the two modes, either one shall be selected:

In inband communication, cellular communication and D2D communication use the same spectrum licensed to the cellular operator: cellular and D2D links may interfere with each other based on how they share the frequencies. The operators must control interference when using the licensed spectrum.

In outband communication, D2D communication uses unlicensed spectrum (e.g., the free 2.4 GHz ISM band or GHz mm Wave band) where cellular communication does not occur. It helps in eliminating the interference between D2D and cellular users although interference is still present from other electronic devices (like Bluetooth and WiFi) operating in this band. D2D links suffer interference from each other as well as from other devices operating in the same band. Interference can be reduced if devices transmit at lower power levels which might, however, affect the QoS at the receiver.

For Wi-Fi technology, all P2P communications are currently inband, that is to say P2P communication and infrastructure communication share the frequencies.

Figure 2:
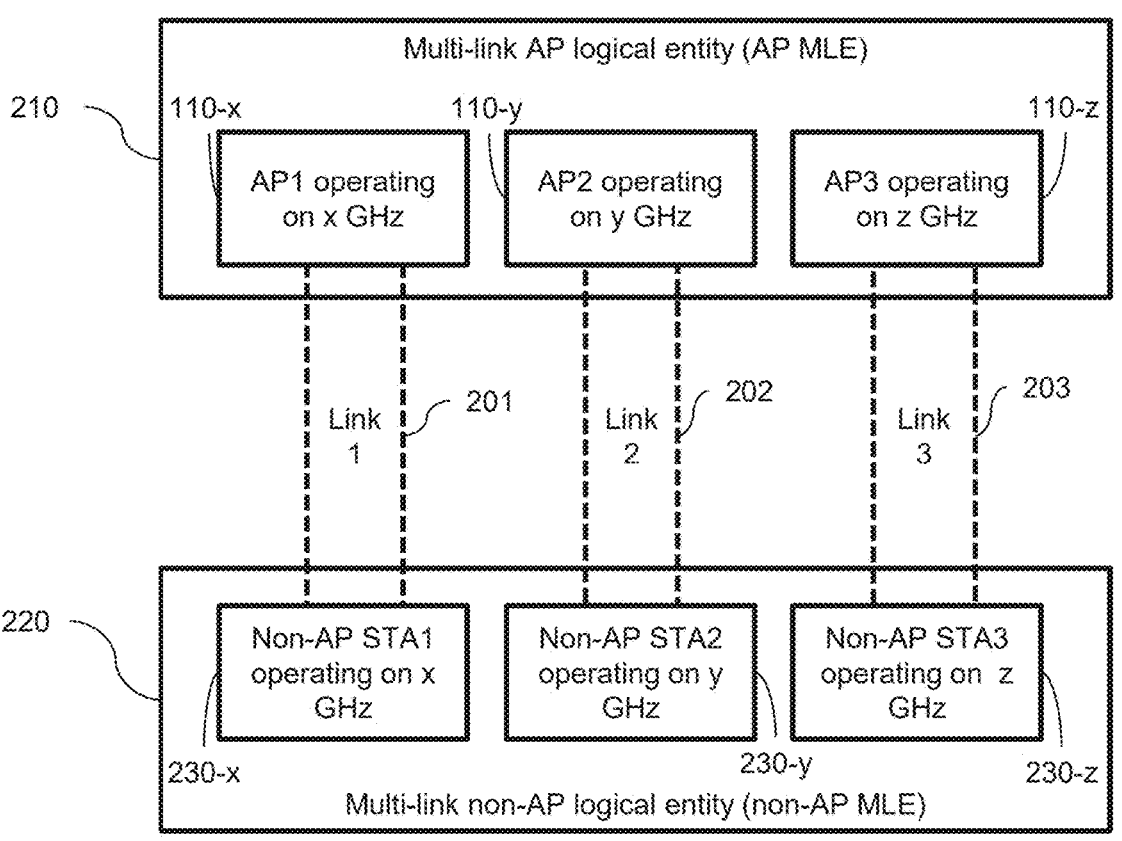
FIG. 2 illustrates an example of a multi-link arrangement in accordance with 802.11be.

FIG. 2 illustrates an example of a multi-link arrangement in accordance with 802.11be.

The 802.11 baseline, namely in its version IEEE P802.11-REVmd, defines the following terminology:

"Station (STA): A logical entity that is a singly addressable instance of a medium access control (MAC) and physical layer (PHY) interface to the wireless medium (WM).

Link: In the context of an IEEE 802.11 medium access control (MAC) entity, a physical path consisting of exactly one traversal of the wireless medium (WM) that is usable to transfer MAC service data units (MSDUs) between two stations (STAs)."

The 802.11be working group introduced recently the notion of Multi-Link logical entity:

"A Multi-Link logical entity is a logical entity that has one or more affiliated STAs. The logical entity has one MAC data service interface and primitives to the LLC and a single address associated with the interface, which can be used to communicate on the distribution system medium (DSM)."

As a result, a Multi-Link logical entity may be seen as a collection of two or more STAs; each STA operating on a specific link (frequency band) and comes with its own link specific PHY and lower MAC layer.

A "multi-link AP logical entity" is a multi-link logical entity, wherein each STA within the multi-link logical entity is an AP. A multi-link non-AP logical entity is a multi-link logical entity, wherein each STA within the multi-link logical entity is a non-AP STA.

It should be noted that the term "multi-link set" may be used in some descriptions herein, but the scope of embodiments is not limited by this terminology. Other terminology may be used, in some cases, including but not limited to: a multi-link logical entity (MLE), a multi-link AP logical entity (MLE AP), a multi-link non-AP logical entity (MLE STA or non-AP MLE STA), multi-link device (MLD), a multi-link AP device (MLD AP), a multi-link non-AP device (MLD STA or non-AP MLD STA) and/or other.

As shown in FIG. 2, multiple APs 110 are included in a multi-link AP logical entity or device 210. In addition, multiple STAs 230 are included in a multi-link non-AP logical entity or device 220.

The APs 110-*x*, 110-*y*, 110-*z* and/or the STAs 230-*x*, 230-*y*, 230-*z* operate in accordance with one or more of IEEE 802.11 a/b/g/n/ac/ad/af/ah/aj/ay, EHT, or another wireless communication standard.

In some embodiments, an AP 110 may be configured to operate in a frequency band that is different from a frequency band of at least one of the other APs 110 of the plurality of APs. In some embodiments, the AP 110 may be co-located with at least one of the other APs 110 of the plurality of APs enclosed in the MLE AP 210.

In some embodiments, multiple APs 110 are collocated in an AP device 210 that supports simultaneous operations to one or more non-AP devices 220. Between the AP 210 device and one non-AP device 220, there are different interfaces related to links 201, 202, 203.

It should be noted that the terminology "link" is used to better align with the IEEE P802.1AX-Rev/D1.1 Bridges and Bridged Networks Link Aggregation, where each MAC and PHY interface is viewed as a link.

In some embodiments, each link may be associated with different frequency operating band (e.g. x=2.4 GHz, y=5 GHz, z=6 GHz). In some embodiments, some links may be associated with a same frequency operating band (e.g. y=z=6 GHz).

In some embodiments, one or more APs in the multi-link set can indicate the information of multi-link set. In some embodiments, one or more links can be established at a specific time, where the term "established" of a link means that: the AP device has all the information to enable data operation with the non-AP device in that link and the non-AP device has all the information to enable data operation with the AP device in that link. Note that other terms may be used for the concept for both sides to have all necessary information of a link.

In some embodiments, preferably the links are considered fully independent, it means in particular that the channel access procedure is performed independently on each link or in other words a per-link backoff procedure is performed with no synchronization of Multi-Link transmissions. It means also that each link could has its own EDCA parameters, e.g. CW_min, CW_max, AIFS, etc.

Figure 3:
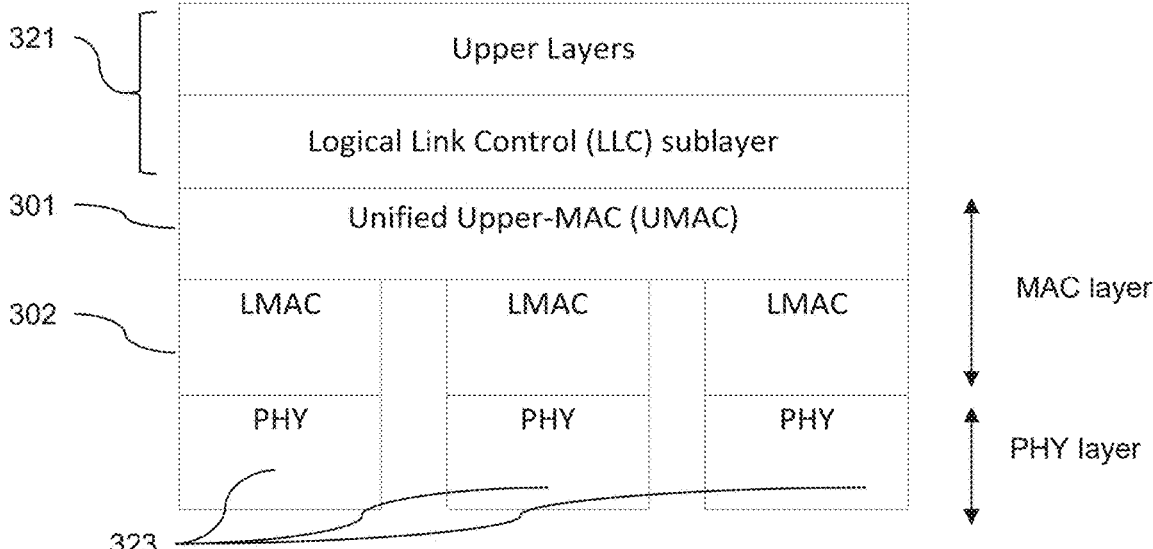
FIG. 3 presents an exemplary multi-link reference model.

FIG. 3 presents an exemplary multi-link reference model.

The Multi-Link reference model requires at MAC level the introduction of protocol referred to as Unified Upper-MAC (UMAC). It offers a unified upper MAC layer interface with the individual link specific lower MACs of each STA (referred to as LMAC) and provides a unified MAC Service Access Point (SAP) to the LLC and upper layers.

Typically, UMAC is responsible for link agnostic MAC procedures such as sequence number assignments, MPDU encryption/decryption, block ack score boarding etc.

Concerning the Multi-Link transmissions, with the introduction of UMAC, the MPDUs belonging to the same TID may be simultaneously transmitted over multiple links:

At TX side, UMAC performs the allocation of MPDUs to different links. The same sequence number space is used across all links.

At RX side, UMAC consolidates the MDPUs arriving over the different links, performs block ack score boarding, MPDUs reordering etc.

A consolidated acknowledgment may be transmitted over one of the links.

In some embodiments, the MLE AP device 210 may exchange signaling with the MLE STA 220 to indicate multiple traffic identifiers (TIDs) for traffic supported by the links to enable different quality-of-service (QoS) for at least some of the links.

It should be noted that embodiments are not limited by the examples provided by FIGS. 2 to 3. For instance, a MLE device may support different number of links. In addition, a non-AP MLE device can negotiate Tx/Rx constraints across the links and is not limited to have support for simultaneous operation across links.

The MLE AP 210 may have different number of interfaces to exchange data between several non-AP MLE STAs 220.

Figure 4A:
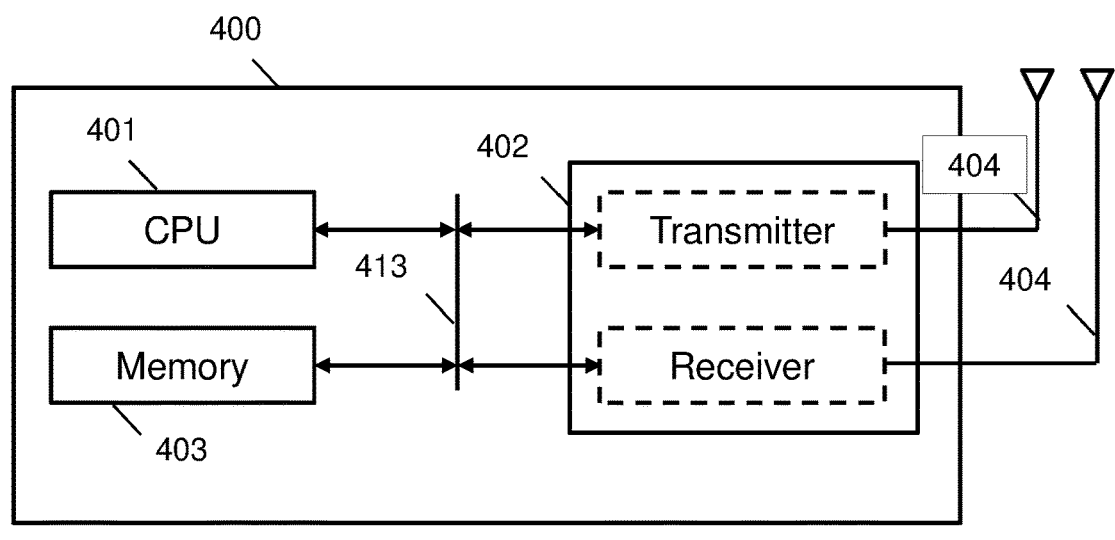
FIG. 4A shows a schematic representation a communication device.

FIG. 4A schematically illustrates a communication device 400, either a non-AP MLE station 220 or the MLE access point 210, of the radio network 100, configured to implement at least one embodiment of the present invention. The communication device 400 may preferably be a device such as a micro-computer, a workstation or a light portable device. The communication device 400 comprises a communication bus 413 to which there are preferably connected:

a central processing unit 401, such as a processor, denoted CPU;

a memory 403 for storing an executable code of methods or steps of the methods according to embodiments of the invention as well as the registers adapted to record variables and parameters necessary for implementing the methods; and at least one communication interface 402 connected to a wireless communication network, for example a communication network according to one of the IEEE 802.11 family of standards, via transmitting and receiving antennas 404.

Preferably the communication bus provides communication and interoperability between the various elements included in the communication device 400 or connected to it. The representation of the bus is not limiting and in particular the central processing unit is operable to communicate instructions to any element of the communication device 400 directly or by means of another element of the communication device 400.

The executable code may be stored in a memory that may either be read only, a hard disk or on a removable digital medium such as for example a disk. According to an optional variant, the executable code of the programs can be received by means of the communication network, via the interface 402, in order to be stored in the memory of the communication device 400 before being executed.

In an embodiment, the device is a programmable apparatus which uses software to implement embodiments of the invention. However, alternatively, embodiments of the present invention may be implemented, totally or in partially, in hardware (for example, in the form of an Application Specific Integrated Circuit or ASIC).

Figure 4B:
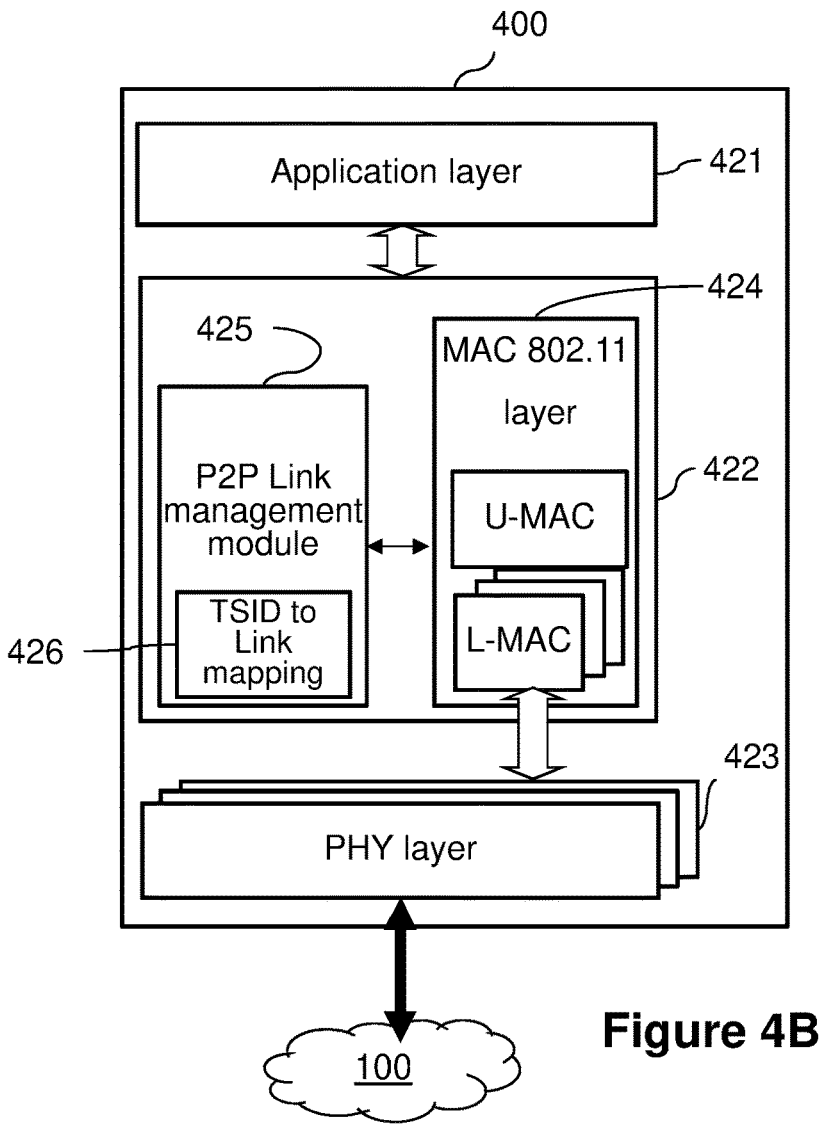
FIG. 4B illustrates schematically the architecture of the communication device of FIG. 4A.

FIG. 4B is a block diagram schematically illustrating the architecture of the communication device 400, either the MLE AP 210 (embedding a plurality of APs 110) or one non-AP MLE STA 220 (embedding a plurality one of stations 230-*x*, 230-*y*, . . . ), adapted to carry out, at least partially, the invention. As illustrated, device 400 comprises a physical (PHY) layer block 423, a MAC layer block 422, and an application layer block 421.

The PHY layer block 423 (here a multiple of 802.11 standardized PHY layer modules) has the task of formatting, modulating on or demodulating from any 20 MHz channel or the composite channel, and thus sending or receiving frames over the radio medium 100, such as 802.11 frames, for instance medium access trigger frames to reserve a transmission slot, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 422 preferably comprises a MLE MAC 802.11 layer 424 implementing conventional 802.11 MAC operations, and additional block 425 for carrying out, at least partially, embodiments of the invention. The MAC layer block 422 may optionally be implemented in software, which software is loaded into RAM 403 and executed by CPU 401. The MLE MAC 802.11 layer 424 may implement an Upper-MAC stack 301 along with a series of Lower-MAC modules 302.

Preferably, the additional block 425, referred to as P2P Link management module for performing multi-link operations for P2P traffic streams, implements part of embodiments of the invention (either from station perspective or from AP perspective).

For instance, and not exhaustively, the operations for the station (AP or non-AP) may include, generating and sending a multi-link request/response frame establishing a link, generating and sending a multi-link open request/response frame allocating a traffic stream onto an established link; and maintaining the corresponding Traffic-Stream to Link' (aka. TSID-to-Link) mapping 426.

MAC 802.11 layer 424 and P2P Link management module 425 interact one with the other in order to establish and process accurately communications over a P2P Link in between multiple MLE non-AP stations according to embodiments of the invention.

On top of the FIG. 4B, application layer block 421 runs an application that generates and receives data packets, for example data packets such as a video stream. Application layer block 421 represents all the stack layers above MAC layer according to ISO standardization.

According to 802.11 be (namely EHT) standard, a non-AP MLE device always establishes a multi-link association with an AP in a multi-link set. The association framework allows a non-AP device to have a frame exchange to associate with any APs in a multi-link set 210 and exchange information of the different links (ex. BSS configuration, AP information of each link, non-AP STA information of each link, capability of each link, Tx/Rx constraints of different links).

Figure 5A:
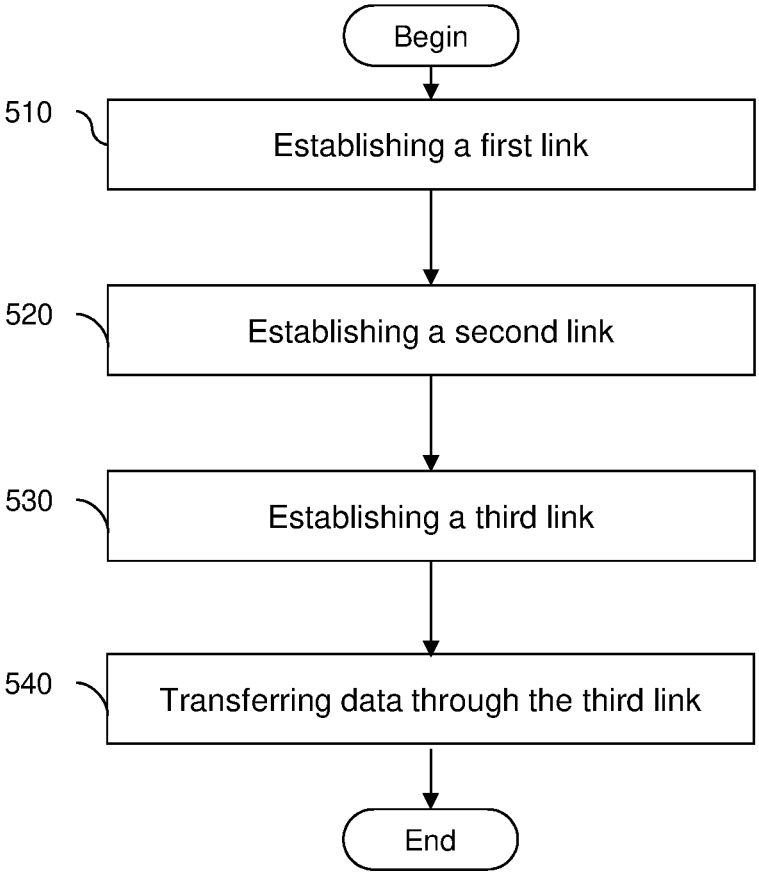
FIGS. 5A and 5B illustrate a general embodiment of disclosed communication methods.
Figure 5B:
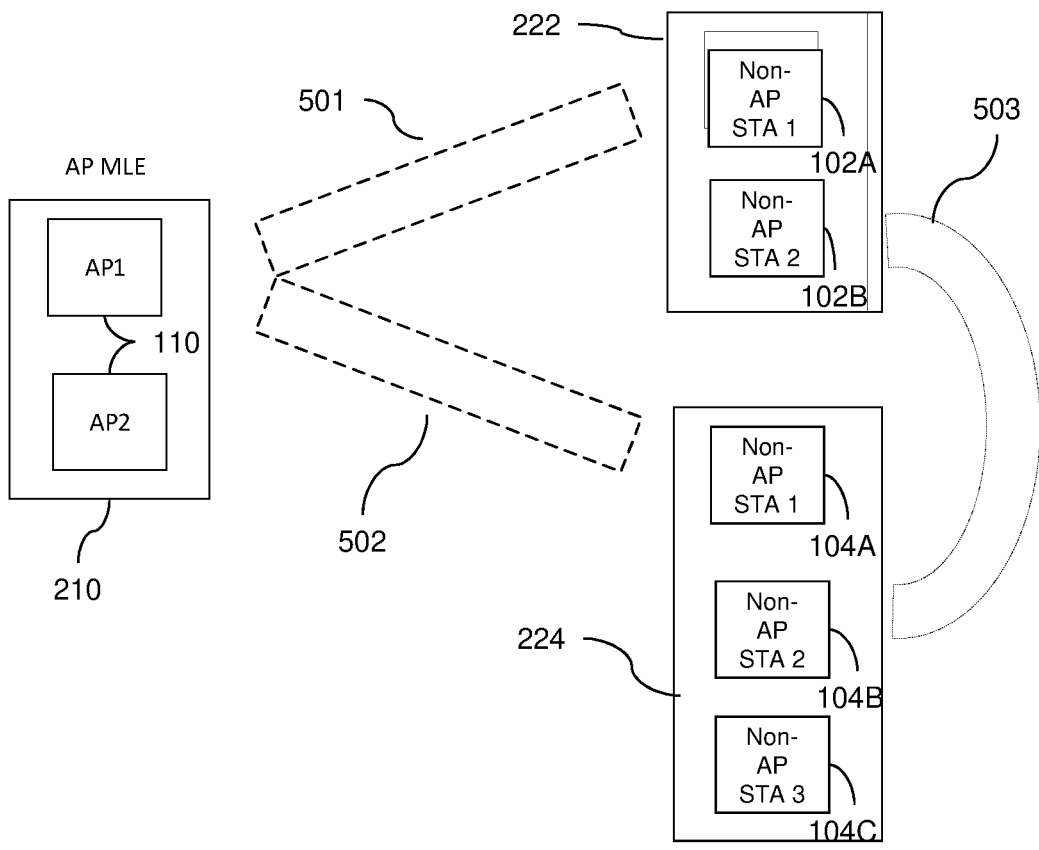

FIGS. 5A and 5B illustrate an embodiment of a method of communication in a wireless network comprising a multi-link access point logical entity, MLE AP 210, and the wireless network comprising at least a first and a second multi-link station logical entities, MLE STAs 222, 224.

The method comprises:

establishing 510 a first link 501 between the first MLE STA 222 and the MLE AP 210;

establishing 520 a second link 502 between the second MLE STA 224 and the MLE AP 210;

establishing 530 a third direct link 503 between the first MLE STA 222 and the second MLE STA 224; and transferring 540 data between the first and the second MLE STAs 222, 224 through the third link 503.

Therefore, FIGS. 5A and 5B illustrate the establishment of a P2P link in between at least two MLE non-AP devices in a multi-link Basic Service Set, BSS.

It should be noted that the establishment of the first and second links may be done in any order or simultaneously.

Traditionally, a non-AP STA associates with an AP to start its operations: 802.11be provides multi-link setup between a multi-link non-AP logical entity and a multi-link AP logical entity to achieve the functionalities of "traditional association" under the new multi-link framework. Capability for different bidirectional links (ex. configuration of the link, AP capability, non-AP STA capability) can be exchanged through multi-link setup.

As a result, at least one link 501 is established in between the non-AP MLE STA1 222 and its MLE AP 210. At least one link 502 is also established in between the non-AP MLE STA2 224 and its MLE AP 210.

In some embodiments, the links 501 and 502 can be the same link, that is to say share the same frequency operation: this link, identified as 'link 1' in the figures may be called "anchor link". Preferably, there is a unique anchor link in a BSS monitored by the MLE AP.

Starting from the established link or links (preferably the single anchor link), both the APs in the multi-link set 210 and MLE STA devices 222, 224 agree to establish a new link 503 between MLE STAs 222 and 224, in order to start P2P data operation.

Among set of the established links, Link1 501 serves for infrastructure operations and Link2 503 serves for direct P2P operations.

Advantageously, Link2 does not interfere with Link1: the medium access is separated and no issue pertains due to the heavy P2P traffic.

As will be further become apparent, the MLE AP still administrate its BSS via the anchor link: the AP may grant by itself the establishment of Link2 which is a P2P link.

Figure 6:
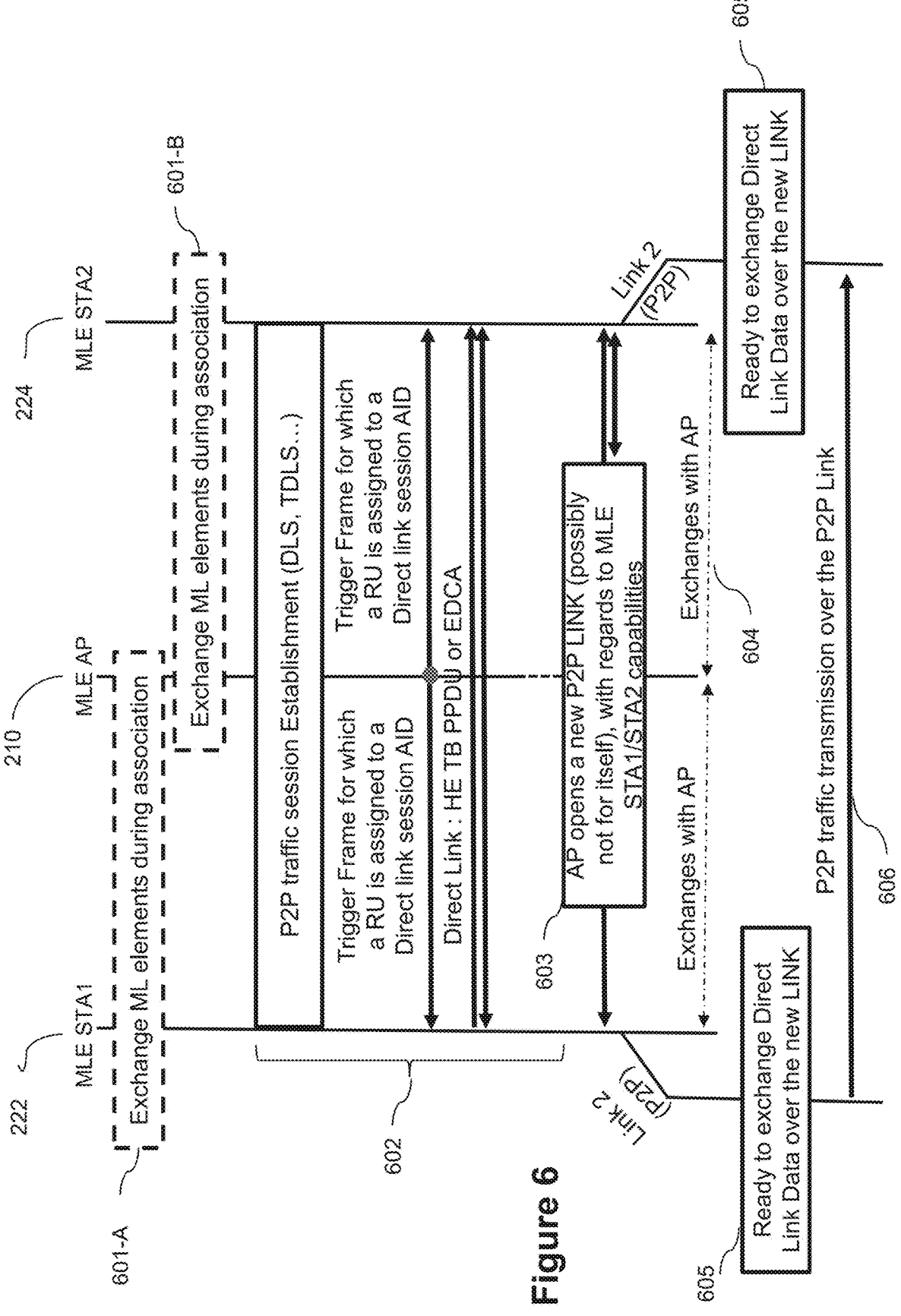
FIG. 6 illustrates a transmission sequence according to a particular embodiment.

FIG. 6 illustrates a transmission sequence according to a particular embodiment.

Phases 601-A and 601-B consist in a multi-link association management, allowing a not-yet-associated non-AP station of a non-AP MLE station to discover and register with an AP of an MLE AP. It comprises three phases: WLAN discovery, authentication and association, at the end of which the station enters into an authenticated and associated state with the AP. After that, the link that has served for the association may be considered as the anchor link (primary link).

In some variants, non-AP MLE station may associate with any AP of the MLE AP, and then may switch onto the anchor link.

Figure 7:
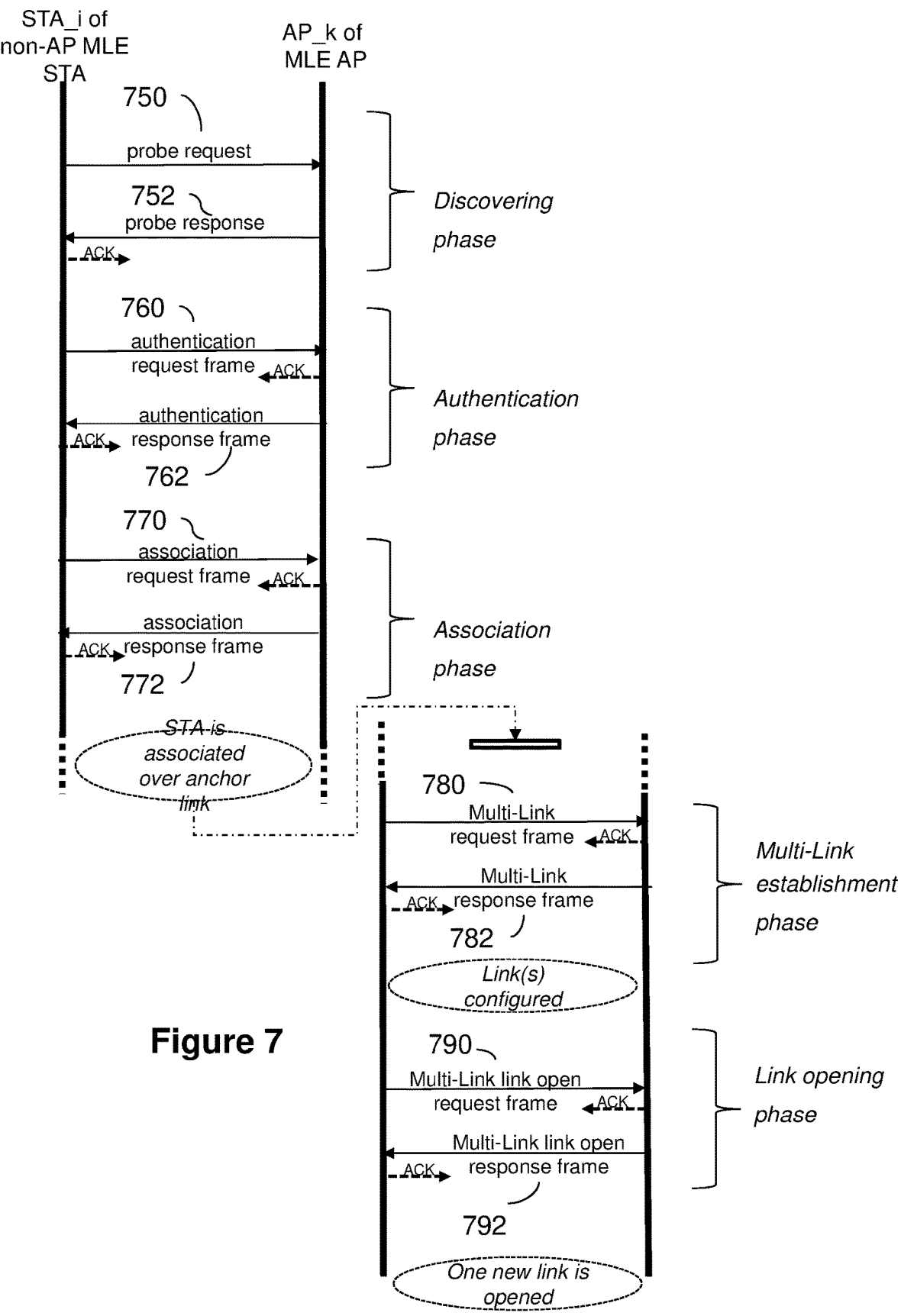
FIG. 7 illustrates a multi-link association phase.

FIG. 7 illustrates this multi-link association phase.

Note that the non-AP station may be currently associated with an AP of a MLE first AP (i.e. belonging to a first WLAN) and willing to join a second WLAN (with which it is not associated).

The WLAN discovery phase includes for the unassociated non-AP station to gather information about the APs of the MLE AP, for instance by sending out Probe Request frames 750 on each wireless 20 MHz channel corresponding to the anchor link. In response to receiving such a Probe Request frame, the AP checks whether the unassociated non-AP station has a common supported data rate or not. In the affirmative, the AP responds with a Probe Response frame 752 providing details of the WLAN: SSID (wireless network name), supported data rates, encryption types, and other 802.11 capabilities of the anchor AP.

The Probe Request frames also provide 802.11 capabilities of the other co-located APs embedded in the MLE AP. As example, several 'Link Capabilities' or 'Multi-Link Capability' Information Elements are stipulated, each one corresponding to a co-located AP different from the anchor AP (the capabilities of the anchor AP being the usual capabilities, that is to say outside any link information element, specified in the probe request frame).

A non-AP station may send Probe Request frames regularly onto other wireless channels to maintain an updated list of available WLANs without any intend to associate with the other WLANs by other APs/MLE APs.

A non-AP station may send Probe Request frames to an AP different from the co-located anchor AP: preferably, the anchor AP is then identified as such inside the 'Link Capabilities' Information Elements.

In some aspects, the list of Link Capabilities may be included in a neighbour report information element. In some other aspects, the list of Link Capabilities may be included in a Multi-Band Operation (MBO) IE. In some other aspects, the list of Link Capabilities may be included in a multi-connectivity IE.

Once the unassociated non-AP station has decided to join a WLAN (based on information gathered from the anchor link), it performs the second authentication phase during which it sends a low-level 802.11 Authentication Request frame 760 to the selected AP. The AP may respond with an Authentication Response frame 762.

Next, the unassociated non-AP station performs actual association with the AP to join the WLAN cell. This stage finalizes the security and bit rate options and establishes the data link between the unassociated non-AP station and the AP. The purpose of this final exchange is for the unassociated non-AP station to obtain its Association Identifier (AID) to be used to access the medium and send data within the joined WLAN. To do so, the unassociated non-AP station sends an Association Request frame 770 to the AP it wishes to join. The Association Request frame contains chosen encryption types if required and other compatible 802.11 capabilities.

If the elements in the Association Request frame match the capabilities of the AP, the AP creates an Association ID (AID) for the unassociated non-AP MLE station and responds with an Association Response frame 772 including the AID and a success message granting network access to the station. Now the non-AP station (and thus the non-AP MLE station) is successfully associated with (registered to) the MLE AP via any of its co-located AP and data transfer can begin on the initial link.

Note that the AID offered to the station may remain the same value independently of the link(s) used in the communication between the MLE AP and the MLE STA: the AID assignment is preferably performed at the U-MAC layer of the MLE AP.

In some aspects, the list of Link Capabilities may also be included in association request or re-association request.

However, differently from the legacy association procedure that is mono-link, the non-AP station shall keep all-links information in order to possibly roam to another co-located AP of same MLE AP but with a better signal strength if needed. This could be performed without using the second and third phases of the association procedure.

In addition, in some embodiments, the MLE AP keeps 802.11 information of all co-located STAs of the MLE non-AP STA: this is further to initiate opening of a P2P link(s) in between non-AP MLE STAs.

Then, the newly-associated non-AP station may perform multi-link operations, that is to say requesting additional information of the possible co-located APs. To do so, the associated non-AP station sends a Multi-Link Request frame 780 to the AP. The AP may respond with a Multi-Link Response frame 782. This phase is optional and aims to complement any already obtained information from Probe Response Frame if needed.

Once complementary links are discovered between the non-AP MLE STA and the MLE AP, then a Multi-Link Link Open Request frame 790 and Multi-Link Link Open Response frame 792 may be exchanged (while the figure shows that non-AP STA sends the request frame 790 and AP sends the response frame 972, the opposite scheme is also possible).

After the frame exchange, a new link is opened and ready for data operation.

In some embodiments, the frames 790-792 may indicate at least one traffic identifiers (TID, 801) for traffic supported by the link; this is to enable different quality-of-service (QoS) for at least some of the links. In preferred embodiments, the TID takes the format (or value) corresponding to a Traffic Stream (TSID), as disclosed further.

In some embodiments, the naming of frames 780-782-790-792 may be different. The frames 780-782 are setup frames aiming to obtain configuration information about one specific link, or per-link configuration information of each of the links ready to be established: frames may be named multi-link setup request/response. The frames 790-792 are activation frames aiming to route TID/TSID on specific links: frames may be named multi-link operation request/ response. Providing no TID/TSID for a given link through those frames is equivalent to a Link Teardown command.

Concerning a Link closure (not represented in the figure), one may use Multi-Link Link Closure Request frame and Multi-Link Link Closure Response frame may be exchanged.

Back to FIG. 6, once the two non-AP MLE STAs 222 and 224 are associated with the MLE AP, they can exchange data over the primary link (phase 602). Even if a P2P session is opened (WiFi-Miracast, TDLS, etc.), the frame exchanges are performed over the same link, that is to say the same frequency channel so that this traffic would become concurrent to other traffic for AP. It is also possible that the AP uses OFDMA Multi-user technique in order to schedule the P2P traffic in sub-bands (e.g. Resource Units) of the primary Link: even in that case, the P2P traffic continuously requests a resource allocation that is no longer profitable to the AP operations.

As a result, the AP may decide to offload the P2P traffic on a distinct Link. Many possibilities may support this decision: buffer status from the STA1 and/or STA2 informing of an important amount of data towards the peer station STA1/STA2; detection of large amount of data to be relayed to stations STA1/STA2 in the AP's buffer; detection of P2P protocol frames; etc.

Thus, the MLE AP (preferably through its anchor AP) may open a new link in between the 2 STAs where to route the P2P flow.

The disclosed embodiments provide for transitioning of a specific (P2P) stream from a first Link 501 to a second link 503, while maintaining other streams with the first link. In other words, a station 222 may remain associated with one AP of MLE AP 210, and transition a portion of its active streams from one link connected to an MLE AP device to another link connected to a second MLE non-AP device.

In some cases, the transitioning 603 is performed by the stations 222 and 224 receiving a messaging exchange from the MLE AP 210 currently providing data services for the stream being transitioned.

In some aspects, the sequence 780-782 and 790-792 as described in FIG. 7 may be initiated by the AP 210 towards each non-AP station. That is to say that the AP emits the request frames, not the station(s). Those messages indicate one or more links that the STAs may use.

Some other aspects may reuse existing management or action frames to provide a multi-link setup request message 780 and/or response message 782:

On-channel Tunneling (OCT) operation: OCT frames are used to transport Management frames between peer MAC Sublayer Management Entity (MLME) entities of MLE multiband capable devices.

Fast session transfer (FST) protocol: FST Setup Request and FST Setup Response frame exchanges aim to transfer operations between an initiator and a responder onto new band/channel.

An Information Element (800, cf. FIG. 8) may be used to identify the traffic stream, stations and targeted links, and is conveyed inside the previous messages.

As a result, the two stations are allowed to both use the 'legacy' link with the AP 604, for legacy usages, along with the use of new opened link between them 605, for P2P flows only.

In some cases, the transitioning 603 is performed by the MLE AP 210 once an admission control is executed in response to receiving messages from the station 222 and/or 224.

A traffic specification (TSPEC) as defined in IEEE 802.11e is a good candidate for a station to signal its traffic requirement to the AP. The TSPEC element contains a set of parameters/fields that define the characteristics and QoS expectations of a traffic flow for a given station. It allows a set of parameters more extensive than might be needed, or might be available, for any particular instance of parameterized QoS traffic.

The station includes the TSPEC in some action frames, like the Add Traffic Stream (ADDTS), to perform an admission request or closure of the characterized traffic in order further to perform transitioning phase 603.

In embodiments, action frames like the Add Traffic Stream (ADDTS) may contains an information subfield indicating if the AP is requested to setup a P2P link.

In preferred embodiments, an AP of MLE AP 210 will monitor only streams that are provided with a TSPEC specification (that is to say with a TSID). The MLE AP is thus ready to establish TSID-to-Link mapping for P2P flow.

In embodiments, the TSID value is previously negotiated in between the two P2P non-AP devices such that a single and common value is selected and provided to the AP. This is to ease the identification of the data traffic stream between the 3 devices.

One may note that 802.11be discloses TID-to-Link mapping by a MLE device: this mapping concerns only categorisation by User priority (TID values in the range 8-15 are reserved, which means not used at that time). Several illustrations of the shortcut 'TID' as referred to a class of traffic are also present in 802.11ax (Multi-TID aggregation, Multi-TID acknowledgment). The disclosed embodiments suggest taking benefit of an existing format (as further more apparent with subfield 801 of FIG. 8) for the sake of clearly identifying a (P2P) traffic stream according to the present invention.

According to 802.11be, concept of "TID-to-Link" mapping means that a given traffic category (User Priority, values 0-7) is mapped on a new link in addition to an existing link.

According to disclosed embodiment, a new TSID-to-Link mapping means that a given traffic stream (TSID, values 8-15) is mapped on a new link (in between two non-AP MLE STAs) in replacement to two existing links (in between a non-AP MLE STA and the MLE AP). In other words, this corresponds that a TSID mapped to one Link means the TSID is unmapped to the anchor link.

This TSID-to-Link mapping may be generalized in another network configuration and not limited to the disclosed embodiment of the document.

The invention also takes advantage of an existing field format 'TID' containing 4 bits used by numerous management or action frames, for conveying TSID information.

Thanks to the TSID-to-Link mapping, a Station 222 is allowed to categorize each frame for a concerned P2P stream (e.g. video frames but also control frames).

In some embodiments, the MLE AP may intend to offload numerous P2P traffics for several MLE stations, that is to say the MLE AP instructs operation 603 several times for several P2P traffics. The 'link' is somewhere a virtual concept, representing a common medium arrangement where several stations are operating. Using a common P2P link for several P2P traffics serves as a means for the MLE AP to make one of its administrated AP managing the medium access and scheduling. As example, the AP can use Multi-user access scheme to trigger P2P flows on the common P2P link: this is to reduce collisions on that link. Note that the triggering is preferably neither uplink (in other words neither towards the AP), but in P2P-style (the AP triggers one STA to emit MU frames to another STA).

According to its scheduling needs, a MLE AP can initiate a DELTS request in order to remove one P2P stream flow from a Link. The MLE AP can also decide on a Link closure, therefore closing all the TS concerned by the Link and addressed Station(s) (e.g. a Link closure request may be broadcast or multicast, either on the legacy Link1 or on the P2P link2).

Figure 8:
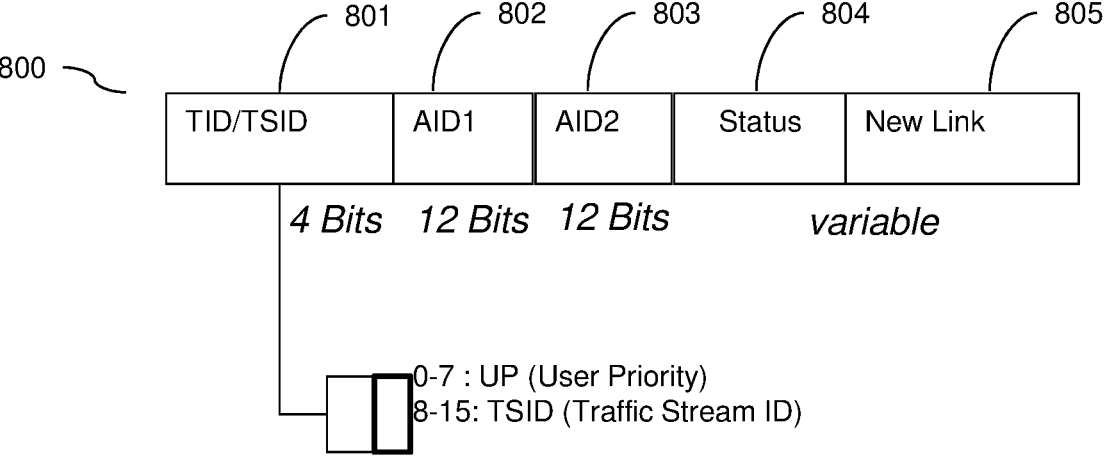
FIG. 8 illustrates an example of an example of a multi-link information element.

FIG. 8 is an example of multi-link information element, IE, 800.

The IE 800 includes a traffic identifier field 801, a status field 804, and a new Link field 805. The IE 800 may be included in the messages 780, 782, 790, 792.

The traffic identifier field 801 may indicate a stream for which the IE 800 pertains. In some aspects, the TID/TSID field 801 may indicate an access category, traffic identifier, and/or other information.

In preferred embodiments, a traffic identifier (TSID) value is considered as this uniquely identify a data stream. This is because categorization by User Priority cannot isolate data packets for a given data traffic stream. TSID-to-Link mapping is well adapted for P2P data flows, Thus, up to 8 traffic streams can be managed in between two MLE non-AP STAs.

The AID1 802 and AID2 803 are used to identify the stations involved in the stream configuration. These subfields carry the 12 LSBs of the AID of a non-AP STA. For example, if the AID2 field 803 has a non-zero value (e.g different from zero or −1), then this may indicate that the identified stream will be conveyed over a P2P Link. If the AID2 field 803 has a wildcard value (e.g. zero or −1), then this may indicate that the identified stream is conveyed over a classical link between STA identified by AID1 value and the AP.

The status field 804 may indicate whether the stream identified by the TID field 801 was transitioned to a new Link or not. For example, a first predetermined value may indicate no transition was performed. A second predetermined value may indicate a transition was made.

The new Link field may indicate, if the stream was transitioned, a Link ID that is now servicing the stream identified by the TID field 801.

In some embodiments, the couple <Status 804, New Link 805> may be replicated several times in the IE 800 in case that the stream has to be conveyed over several links. This may enable a traffic flow to be distributed on multiple links, therefore providing a multi-link aggregation service in order to significantly ensure higher throughput or higher reliability.

Optionally (not represented in the figure), a 2-bit-length subfield 806 referred to as Direction, may specify the direction of data carried by the traffic stream.

If first bit is equal to 0 and second bit is equal to 0, it may mean that the direction of the traffic stream is from a non-AP station with AID1 to station corresponding to AID2 (possibly the AP when AID2 is wildcard, thus this is an uplink direction). If first bit is equal to 1 and second bit is equal to 0, it may mean that the direction of the traffic stream is from station corresponding to AID2 to a non-AP station corresponding to AID1 (when AID2 is wildcard, this is a downlink direction from AP to STA). If first bit is equal to 0 and second bit is equal to 1, it means that the direction of the traffic stream is bidirectional.

Figure 9:
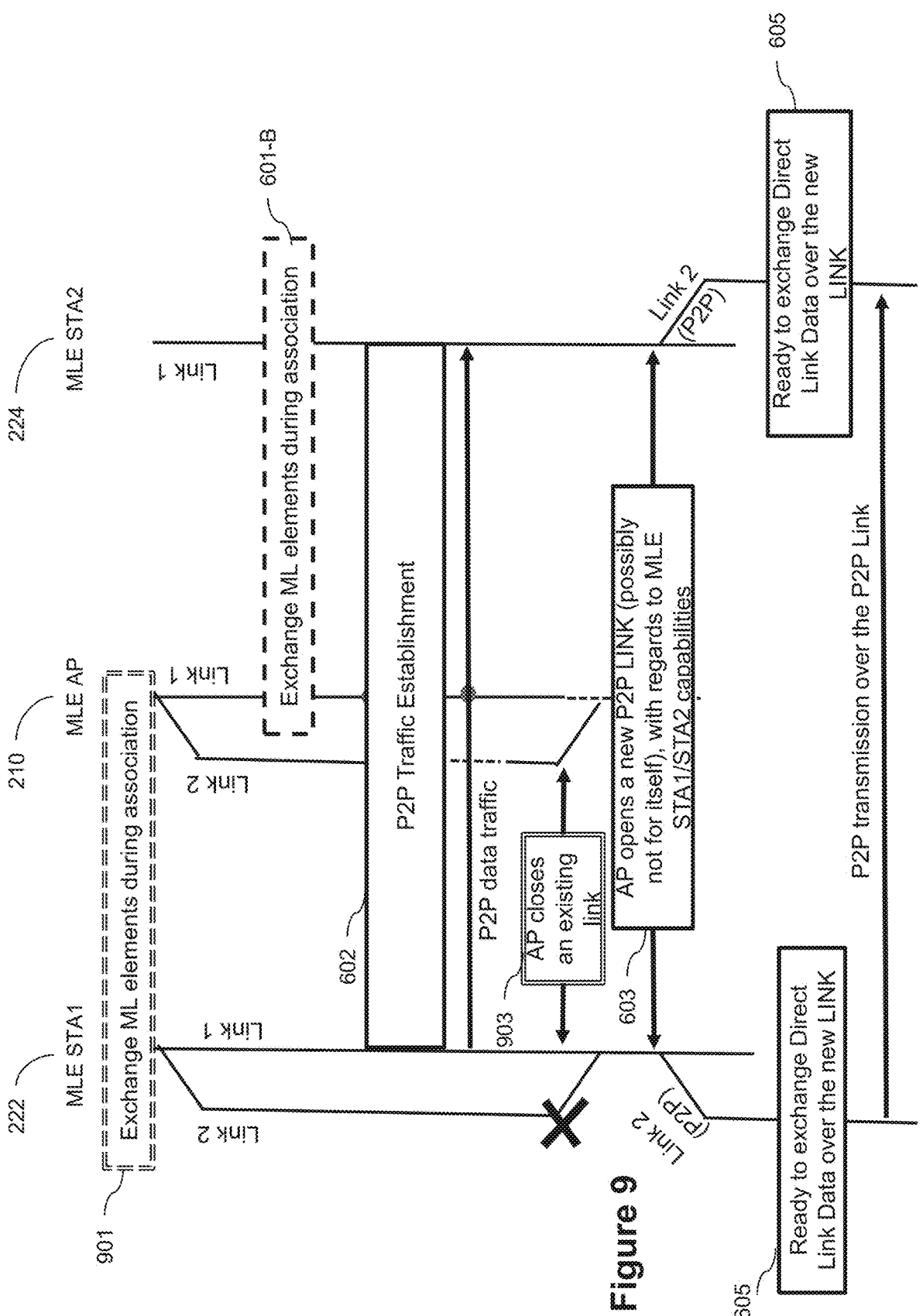
FIG. 9 illustrates a transmission sequence according to another embodiment.

FIG. 9 illustrates a variant of FIG. 6, wherein several Links have been opened when a station associates with its MLE AP. As example, the two links may serve as link bandwidth aggregation towards the AP. In addition, two co-located APs are active on the MLE AP.

If the MLE station 222 supports only two Links (thus having two co-located STAs), then there is no possibility to open a new Link for P2P traffic.

The MLE AP may decide to open a P2P Link as it may determine that this is more preferable to offload a P2P data traffic on a separate link compared to aggregate the two links (resulting still in the AP relaying a huge traffic).

The MLE AP thus has to close an existing Link (phase 903): the anchor link (e.g. Link1) shall be conserved active.

As already disclosed, this may be performed by the MLE AP sending Link closure command on any one of the two Links.

Figure 10:
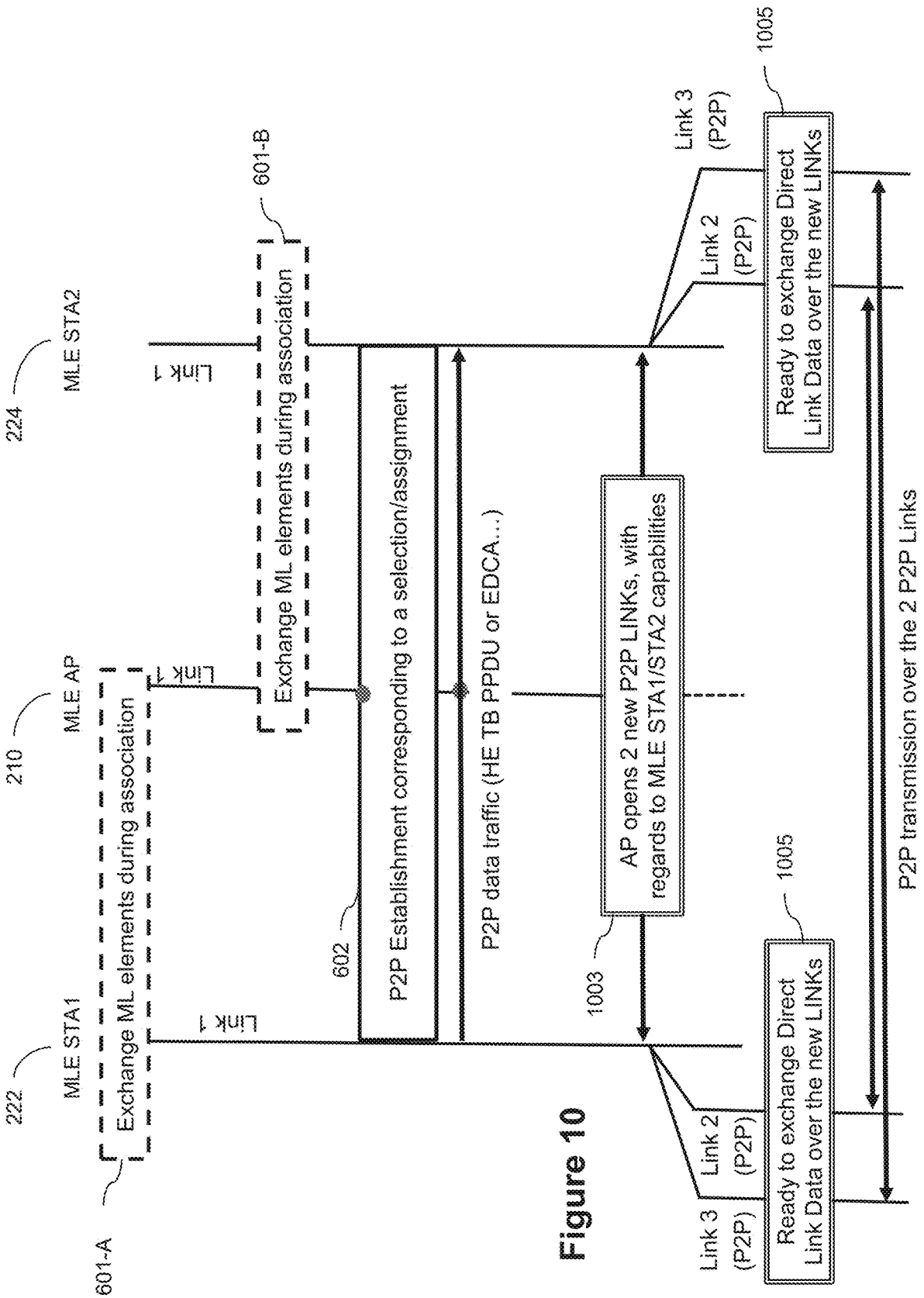
FIG. 10 illustrates a transmission sequence according to a third embodiment.

FIG. 10 illustrates another variant of FIG. 6, wherein the MLE AP determines that more than one P2P Link should be opened.

This can be the case if each non-AP MLE station has at least 3 co-located STAs. With regards to FIG. 5, this implies that non-AP MLE station 222 has also 3 non-AP STA as for non-AP MLE 224.

The Link transition phase 1003 may be different form phase 603 of FIG. 6. The multi-link setup request/response sequence (messages 780-782) may be performed several times; and/or the activating frame sequence (messages 790-792) may be performed several times. Possibly any of those sequences may be performed once, in view of the messages supporting information of several links.

Figure 11:
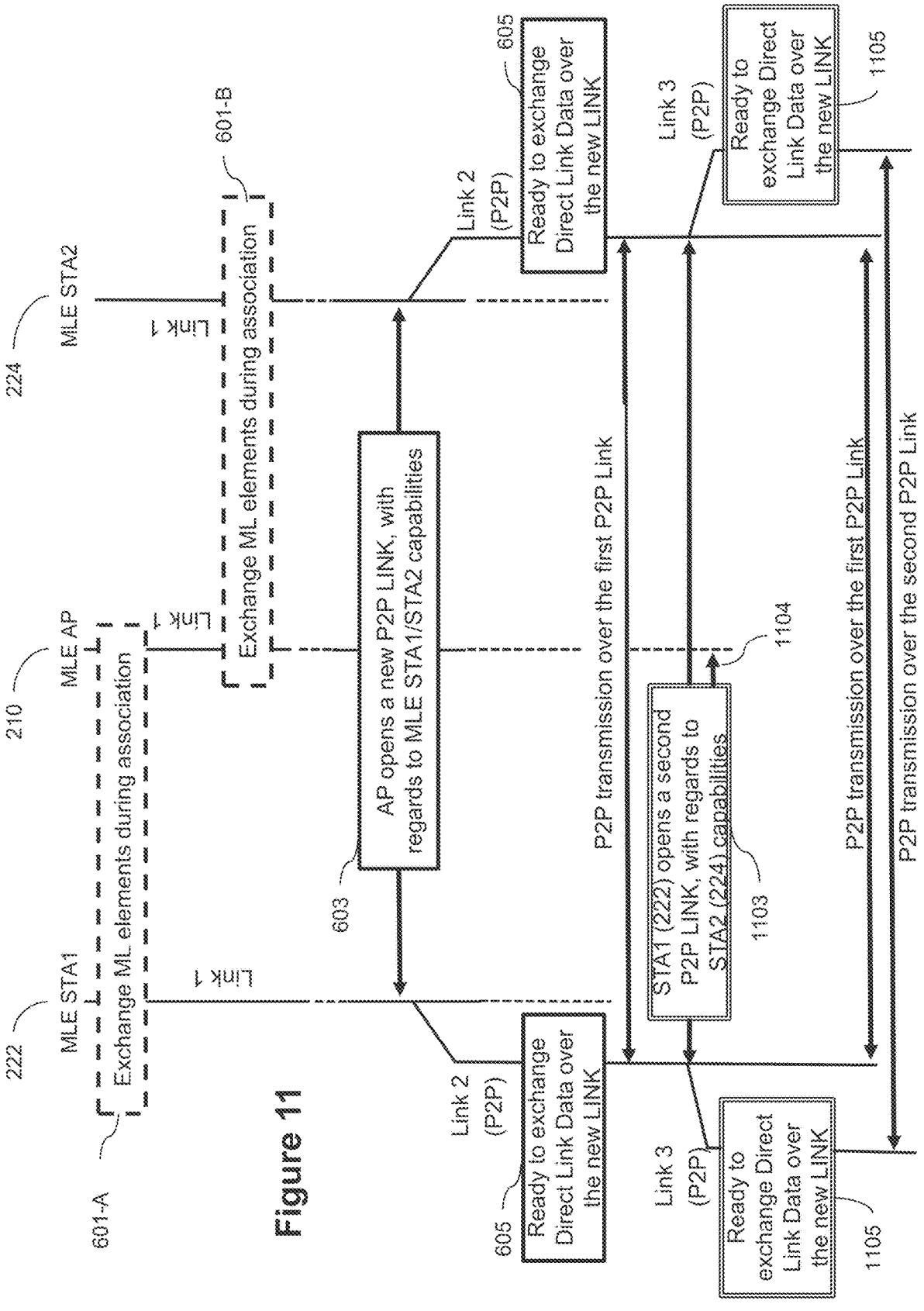
FIG. 11 illustrates a transmission sequence according to a fourth embodiment.

FIG. 11 illustrates yet another variant of FIG. 6, wherein at least one MLE STA determines that more than one additional P2P Link should be opened. Typically, this decision may be performed after an initial P2P is already active, in order to ensure lower latency or offering larger bandwidth (e.g. new interactive stream flows are started in between the two peer stations).

In the exemplary figure, STA 222 executes a Phase 1103, consisting of a new Link transition phase: Purpose is to offer Link aggregation for P2P links in between the two MLE STAs.

STA 222 have obtained, by means well known in the art, some information regarding the possibility to create link(s) with its peer MLE STA2 224.

Optionally, STA 222 and 224 may exchange Multi-Link request/response frames 780-782 after the initial P2P Link was established in order to know better capability of each other.

At least one of stations (e.g. STA 222) will activate the frame sequence (messages 790-792) for creating a new direct P2P Link.

The messages may be conveyed over any existing link: the legacy link with the MLE AP (in that case the MLE AP will relay the frames and is aware of the additional link opening), or in direct within the context of the first P2P link.

As a result, two P2P links are opened, over which the P2P traffic stream(s) is/are conveyed.

FIG. 12 is a flowchart of a method for transitioning a traffic stream from one link to another link (called P2P link), performed by one AP co-located in a MLE AP 210, in the exemplary context of FIG. 6.

In step 1201, multi-link capability information for a first MLE station is decoded from an information element 800 by the AP. In some aspects, the information element is decoded from a management frame, such as a probe request, probe response, association request or re-association request. The multi-link capability information indicates whether the first station supports a multi-link capability, or an ability to establish at least one P2P Link with another non-AP MLE STA (simultaneously to the existing link with the AP) and transmit/receive data via the two link accesses. In addition, AP will store all supported link characteristics that it has received from the station.

Step 1202 is equivalent to step 1201, for a second MLE non-AP STA.

Those steps correspond respectively to phases 601-A and 601-B.

Test 1203 corresponds to the validation step preceding the phase 603. As previously addressed, the AP may decide to offload the P2P traffic on a distinct Link as a consequence to local issues (buffer, etc). As other option, the station 222 and/or 224 informs the AP of the P2P traffic via an admission-control-like procedure: The TSPEC information structure is provided to the AP as a request to switch the concerned traffic stream on a P2P link.

If decision operation is positive, the AP may retrieve a common link configuration for the two stations.

Step 1205 configures the AP to memorize the selected Link (via a Link ID), along the stations involved and the TSID, in a portion of its memory.

Then the step 1206 consists in executing phase 603.

In some aspects, the Link transition phase is encoded as a series of action frames, like messages 780-782 and 790-792 as described in FIG. 7.

The P2P traffic stream may be identified via the information element 800, containing the traffic stream identifier TSID, which may be included in a field of the messages involved in the Link transition phase.

Message 790 may also indicate whether the link transition is required or not.

The link transition response message 792 may indicate a status of the transmission.

FIG. 13 is a flowchart of a method for transitioning a traffic stream from one link (legacy link with the MLE AP) to another link (called P2P link), performed by one non-AP station co-located in a non-AP MLE STA.

At step 1301, a multi-link capability information is sent to an MLE AP: this capability can be provided through information element(s) in management frame, such as association request/response frames.

The multi-link capability information may indicate whether the MLE station supports link transition request/response messages 780-782-790-792 or not.

In some aspects, Probe Request and Association Request frames may include the list of Links that the station can support.

The list of links may be used, at a later time, to transition (legacy) links between APs of the MLE AP and (P2P) links between STA of a non-AP MLE STA.

Probe Response and Association Response frames may include the list of links that the AP can support with the station. The list of links may be used, at a later time, to transition (respectively aggregate) data packets (based on type of Traffic) to a different access point (respectively to several access points) of the MLE AP.

At step 1302, the non-AP MLE STA performs its usual communications with its AP, including data stream that is finally intended to another non-AP MLE STA (but is relayed by an AP of MLE AP).

At step 1303, the station decodes a link transition request message. The link transition request message may be received from one AP of the MLE AP (preferably the AP corresponding to the anchor link) during phase 603.

The link transition request message may include one or more of the fields discussed above with respect to FIG. 8. For example, one or more of a traffic stream identifier TSID, station identifier, status code, Link list, and a required indication may be decoded from the Link transition request message in various aspects.

In response to receiving the Link transition request message, the station may first determine whether to transition into the link in decision operation 1303. For example, in some aspects, if the required indication in the link transition request message indicates the transition is required, the decision is straight forward, and the station determines to transition the Traffic Stream identified by TSID into the identified link.

In some embodiments like described with regards to FIG. 11, a STA can also receive a link transition request message from another non-AP MLE STA (phase 1103). The multi-link request message 780 may request a list of links to which the transmitting device may designate as to communicate with. When the new link is opened, the operation may also include configuring the initiating station to transmit a "multi-link link open indication" message to the first AP of MLE AP in order to make the MLE AP aware of active links in its BSS.

Step 1304 configures the STA to memorize the selected link (via a Link ID), along the peer station involved and the TSID, in a portion of its memory. This is to make effective the routing, onto new P2P link(s), of the frames belonging to the P2P stream.

Transitioning the P2P traffic stream to a new link(s) may include configuring (step 1305) the MLE station to transmit data associated with the traffic ID to the designated link(s), and/or decoding data from the designated link(s) to determine the data is associated with the traffic stream (TSID).

After the link transition is performed, process moves to operation 1306, which encodes a link transition response message 792. The encoded message may include a status indicating the link transition was accomplished.

Although the present invention has been described herein above with reference to specific embodiments, the present invention is not limited to the specific embodiments, and modifications will be apparent to a skilled person in the art which lie within the scope of the present invention.

Many further modifications and variations will suggest themselves to those versed in the art upon referring to the foregoing illustrative embodiments, which are given by way of example only and which are not intended to limit the scope of the invention, that being determined solely by the appended claims. In particular, the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of communication in a wireless network comprising an access point multi-link device, AP MLD, and the wireless network further comprising first and second station multi-link devices, STA MLDs, the method comprising:

establishing a first link between a station of the first STA MLD and an Access Point of the AP MLD;

establishing a second link between a station of the second STA MLD and an Access Point of the AP MLD;

establishing a third direct link between a station of the first STA MLD and a station of the second STA MLD; and transferring data traffic initially conveyed between the first and the second STA MLDs over the first and second links, to the third direct link wherein, for performing the transferring, the first STA MLD is configured to, in response to a link transition message that the AP MLD transmits over the first link with the first STA MLD, unmap a traffic stream identifier, TSID, for identifying the data traffic, in a unified upper-MAC, UMAC, of the first STA MLD, from the first link, and map the TSID to the third direct link, the second STA MLD is configured to, in response to a link transition message that the AP MLD transmits over the second link with the second STA MLD, unmap the TSID, in UMAC of the second STA MLD, from the second link, and map the TSID to the third direct link, and wherein the link transition message includes at least the TSID and information for identifying the third direct link.

2. The method of claim 1, wherein the establishing a third direct link comprises sending, by the AP MLD, parameters of the third direct link to the first and second STA MLDs through the first and second links.

3. The method of claim 2, wherein the AP MLD comprises at least first and second Access Points and each of the first and second STA MLDs comprises at least a first station and a second station, and wherein the AP MLD has a single medium access control, MAC, service access point to an upper layer and each of the STA MLDs has a single MAC service access point to an upper layer.

4. The method of claim 3, wherein
the establishing a first link comprises establishing a link between the first station of the first STA MLD and the first Access Point of the AP MLD;
the establishing a second link comprises establishing a link between the first station of the second STA MLD and the first Access Point of the AP MLD.

5. The method of claim 3, wherein establishing the third direct link uses at least one of the first and the second links.

6. The method of claim 1, wherein the AP MLD comprises at least first and second Access Points and each of the first and second STA MLDs comprises at least a first station and a second station, and wherein the AP MLD has a single medium access control, MAC, service access point to an upper layer and each of the STA MLDs has a single MAC service access point to an upper layer.

7. The method of claim 6, wherein
the establishing a first link comprises establishing a link between the first station of the first STA MLD and the first Access Point of the AP MLD;
the establishing a second link comprises establishing a link between the first station of the second STA MLD and the second Access Point of the AP MLD.

8. The method of claim 7, wherein
the establishing a third direct link comprises establishing a link between the second station of the first STA MLD and the second station of the second STA MLD.

9. The method of claim 6, wherein
the establishing a first link comprises establishing a link between the first station of the first STA MLD and the first Access Point of the AP MLD;
the establishing a second link comprises establishing a link between the first station of the second STA MLD and the first Access Point of the AP MLD.

10. The method of claim 9, wherein
the establishing a third direct link comprises establishing a link between the second station of the first STA MLD and the second station of the second STA MLD.

11. The method of claim 6, wherein
the establishing a third direct link comprises establishing a link between the second station of the first STA MLD and the second station of the second STA MLD.

12. The method of claim 1, wherein a traffic stream is mapped onto the third direct link.

13. The method of claim 12, wherein the traffic stream mapping is associated with the traffic stream being unmapped from the first or the second link.

14. The method of claim 12, wherein the wireless network is 802.11e compliant, and the traffic stream is identified by a Traffic Stream Identifier, TSID, the TSID being independent of any traffic priority.

15. The method of claim 14, wherein the traffic stream contains frames of at least two traffic priorities stored in at least two Access Category queues.

16. A method of communication in a wireless network comprising an access point multi-link device, AP MLD, and the wireless network further comprising first and second station multi-link devices, STA MLDs, the method comprising, for the AP MLD:
establishing a first link between a station of the first STA MLD and an Access Point of the AP MLD;
establishing a second link between a station of the second STA MLD and an Access Point of the AP MLD; and
establishing a third direct link between the first STA MLD and the second STA MLD, and for transferring data traffic initially conveyed over the first and second links to the third direct link, transmitting a link transition message that includes a TSID for identifying the data traffic and information for identifying the third direct link to the first STA MLD and the second STA MLD over the first link or the second link,
wherein the first STA MLD is configured to, in response to the message, unmap the TSID, in UMAC of the first STA MLD, from the first link, and map the TSID to the third direct link, and
wherein the second STA MLD is configured to, in response to the message, unmap the TSID, in UMAC of the second STA MLD, from the second link, and map the TSID to the third direct link.

17. A method of communication in a wireless network comprising an access point multi-link device, AP MLD, and the wireless network further comprising first and second station multi-link devices, STA MLDs, the method comprising, for each STA MLD:
establishing a first link between a station of the STA MLD and an Access Point of the AP MLD; and
establishing a third direct link between a station of the first STA MLD and a station of the second STA MLD;
wherein, for transferring data traffic initially conveyed over the first link established with the AP MLD to the third direct link, the STA MLD is configured to receive, from the AP MLD, a link transition message that includes a TSID for identifying the data traffic and information for identifying the third direct link, and
wherein, in response to the message, the TSID, in UMAC of the STA MLD, is unmapped from the first link, and mapped to the third direct link.

18. A communication device in a wireless network comprising an access point multi-link device, AP MLD, and the wireless network further comprising first and second station multi-link devices, STA MLDs, the communication device, acting as the AP MLD, comprising at least one microprocessor configured for carrying out the steps of the method according to claim 16.

19. A computer program product for a programmable apparatus, the computer program product comprising a sequence of instructions for implementing a method according to claim 1, when loaded into and executed by the programmable apparatus.

20. A non-transitory computer-readable storage medium storing instructions of a computer program for implementing a method according to claim 1.

* * * * *